(12) United States Patent
Mehta et al.

(10) Patent No.: US 8,484,804 B2
(45) Date of Patent: Jul. 16, 2013

(54) HOOD HINGE ASSEMBLY FOR VEHICLE

(75) Inventors: Himanshu H. Mehta, Ann Arbor, MI (US); Gregory S. Erwin, Shelby Township, MI (US); David E. Thomas, Clarkston, MI (US); Alvin N. Standard, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 12/901,746

(22) Filed: Oct. 11, 2010

(65) Prior Publication Data

US 2012/0084942 A1 Apr. 12, 2012

(51) Int. Cl.
*E05D 15/32* (2006.01)

(52) U.S. Cl.
USPC ........... 16/370; 16/368; 180/274; 296/187.09

(58) Field of Classification Search
USPC ................ 16/366, 368–370, 282, 287, 294, 16/302; 180/69.2, 69.21, 274; 296/193.11, 296/187.09
See application file for complete search history.

(56) References Cited

U.S. PATENT DOCUMENTS

| | | | | |
|---|---|---|---|---|
| 5,765,895 A * | 6/1998 | Rose et al. | ...................... | 296/76 |
| 6,217,108 B1 * | 4/2001 | Sasaki | ..................... | 296/187.09 |
| 6,257,657 B1 * | 7/2001 | Sasaki | ..................... | 296/187.09 |
| 6,364,402 B1 * | 4/2002 | Sasaki | ..................... | 296/187.09 |
| 6,513,617 B2 * | 2/2003 | Sasaki et al. | .................. | 180/274 |
| 6,588,526 B1 * | 7/2003 | Polz et al. | .................. | 180/69.21 |
| 6,637,536 B1 * | 10/2003 | Polz et al. | ..................... | 180/271 |
| 6,755,268 B1 * | 6/2004 | Polz et al. | .................. | 180/69.21 |
| 6,964,316 B1 * | 11/2005 | Polz et al. | ..................... | 180/274 |
| 7,011,442 B2 | 3/2006 | Okuwaki et al. | | |
| 7,195,090 B2 * | 3/2007 | Parks et al. | ..................... | 180/271 |
| 7,207,406 B1 * | 4/2007 | Polz et al. | .................. | 180/69.21 |
| 7,231,995 B1 * | 6/2007 | Polz et al. | .................. | 180/69.21 |
| 7,303,040 B2 * | 12/2007 | Green et al. | ..................... | 180/274 |
| 7,334,656 B2 * | 2/2008 | Kramarczyk et al. | ......... | 180/274 |
| 7,374,008 B1 * | 5/2008 | Neal et al. | ..................... | 180/274 |
| 7,413,049 B2 * | 8/2008 | Schramm et al. | ............ | 180/274 |
| 7,552,789 B2 * | 6/2009 | Gust | ........................... | 180/69.21 |
| 7,591,333 B1 * | 9/2009 | Polz et al. | ..................... | 180/69.2 |
| 7,594,555 B2 * | 9/2009 | Lutter et al. | ................ | 180/69.21 |
| 7,596,833 B2 * | 10/2009 | Erwin | .............................. | 16/370 |
| 7,681,685 B2 * | 3/2010 | Herzog et al. | ................ | 180/274 |
| 7,854,289 B2 * | 12/2010 | Gust | ............................. | 180/274 |
| 7,946,376 B2 * | 5/2011 | Hayashi et al. | ................ | 180/274 |
| 7,954,588 B2 * | 6/2011 | Inomata et al. | ............... | 180/274 |
| 7,975,797 B2 * | 7/2011 | Yuasa et al. | ..................... | 180/274 |
| 8,069,943 B2 * | 12/2011 | Takahashi | ..................... | 180/274 |
| 8,141,671 B2 * | 3/2012 | Aoki et al. | .................. | 180/69.21 |
| 2002/0011371 A1 * | 1/2002 | Sasaki et al. | ..................... | 180/274 |
| 2007/0062747 A1 * | 3/2007 | Erwin | ........................ | 180/69.21 |

FOREIGN PATENT DOCUMENTS

DE 20313924 U1 * 2/2005

* cited by examiner

*Primary Examiner* — William L. Miller
(74) *Attorney, Agent, or Firm* — Ingrassia Fisher & Lorenz, P.C.

(57) ABSTRACT

A hood hinge assembly is provided for operatively attaching a hood to a vehicle. The assembly includes a base link configured to be coupled to the vehicle; a deploy link coupled to the base link; and a hood link coupled to the deploy link and configured to be coupled to the hood. In a first transition from a first position into a second position, the base link and the deploy link pivot with one another relative to the base link, and, in a second transition from the first position into a third position, the hood link pivots relative to the deploy link.

15 Claims, 9 Drawing Sheets

HOOD HINGE ASSEMBLY FOR VEHICLE

TECHNICAL FIELD

The present invention generally relates to hinges, and more particularly, to a hood hinge assembly for a vehicle.

BACKGROUND OF THE INVENTION

A hood is typically attached to the body of a vehicle with a hinge that enables the hood to be opened at the front end to gain access to the engine and other components in the engine compartment of the vehicle. Some hood hinge assemblies have been developed to move the back end of the hood away from the engine block when the hood experiences an impact. In such cases, however, the hinges do not prevent movement of the hood in the fore and aft directions, which may result in misalignment of the hood. Furthermore, some of these movable hinges may be bulky and therefore difficult to incorporate into a vehicle without interfering with other components.

Accordingly, it is desirable to provide an improved hinge assembly that, when impacted, enable the hood to move away from the vehicle body. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In an exemplary embodiment, a hood hinge assembly is provided for operatively attaching a hood to a vehicle. The assembly includes a base link configured to be coupled to the vehicle, a deploy link coupled to the base link, and a hood link coupled to the deploy link and configured to be coupled to the hood. In a first transition from a first position into a second position, the base link and the deploy link pivot with one another relative to the base link, and, in a second transition from the first position into a third position, the hood link pivots relative to the deploy link.

In another exemplary embodiment, a hood hinge assembly is provided for operatively attaching a hood to a vehicle. The hood hinge includes a base link configured to be coupled to the vehicle; a first intermediate link coupled to the base link at a first pivot point; a second intermediate link coupled to the base link at a second pivot point; a deploy link coupled to the first intermediate link at a third pivot point and to the second intermediate link at a fourth pivot point; a hood link coupled to the deploy link at a fifth pivot point and configured to be coupled to the hood; and a tether extending between the hood link and the base link. In a first transition from a first position into a second position, the base link and the first intermediate link pivot about the first pivot point, the base link and the second intermediate link pivot about the second pivot point, the deploy link and the first intermediate link pivot about the third pivot point, and the deploy link and the second intermediate link pivot about the fourth pivot point. In a second transition from the first position into a third position, the hood link and the deploy link pivot about the fifth pivot point.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Broadly, exemplary embodiments discussed herein relate to hood hinge assemblies that attach a hood to a vehicle body. The hood hinge assembly includes a number of links that are coupled together to define first, second, third, fourth, and fifth pivot points. During service, in which the front of the hood is lifted, the hinge assembly pivots about the first, second, third, and fourth pivot points to open the hood. When the hood experiences an impact, an actuator provides a force to the hinge assembly such that the hinge assembly pivots about the fifth pivot point and lifts the back end of the hood.

Figure 1:
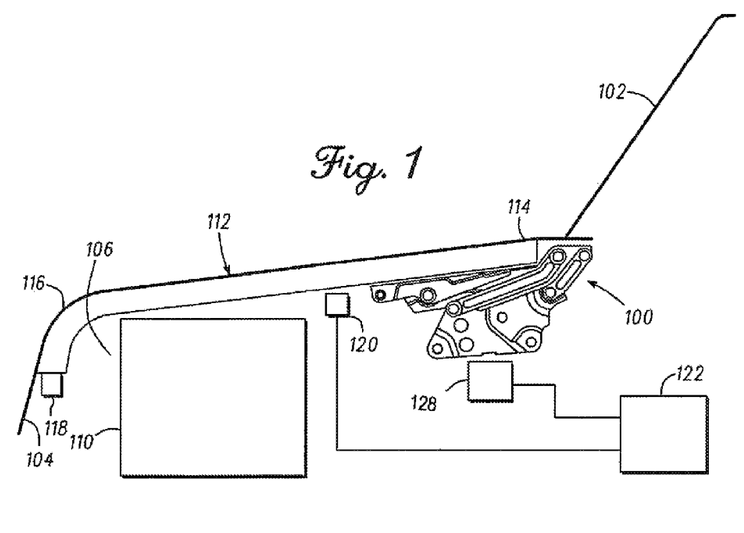
FIG. 1 is a side schematic view of a vehicle with a hood hinge assembly in a closed position in accordance with an exemplary embodiment.

FIG. 1 is a side schematic view of a hood hinge assembly 100 installed in a vehicle 102, such as a motor vehicle, in accordance with an exemplary embodiment. Such vehicles 102 typically include a body 104 (partially shown) forming an engine compartment 106. An engine 110 is disposed within the engine compartment 106. The vehicle 102 also includes a hood 112 illustrated in a closed (or first) position in FIG. 1 to suitably cover the engine compartment 106 and the engine 110.

The back end 114 of the hood 112 is operatively attached to the vehicle 102 by at least one laterally spaced hinge assembly 100. Although a number of hinge assemblies 100 may cooperate to attach the hood 112, only one hinge assembly 100 is illustrated for clarity in FIG. 1 and will be subsequently described. The hood 112 may also be releasably coupled to the vehicle 102 at a front end 116 by a latch 118.

Figure 2:
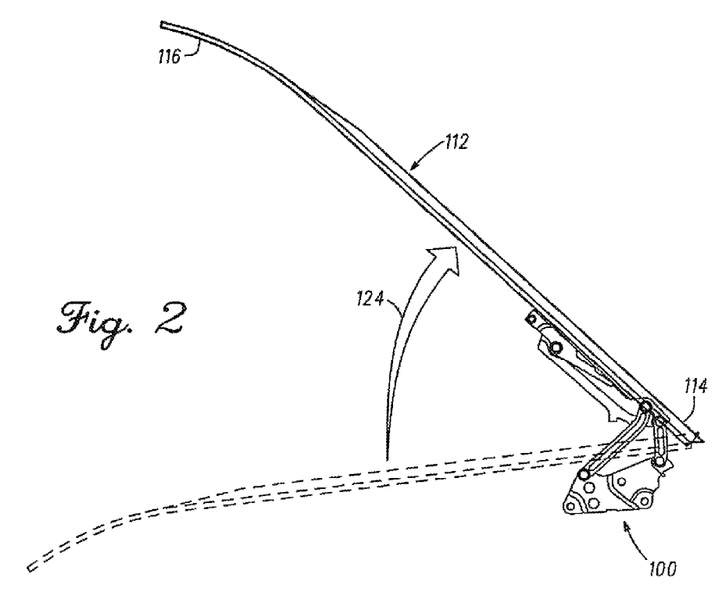
FIG. 2 is a side view of a hood with the hood hinge assembly of FIG. 1 in a service position.

The hood 112 is opened for service by releasing the latch 118 and lifting the front end 116 of the hood 112. As such, upon release of the latch 118, the hinge assembly 100 enables a pivotal attachment between the hood 112 and the vehicle 102. FIG. 2 is a side view of the hood 112 and the hinge assembly 100 in a service (or second) position. FIG. 2 illustrates the direction 124 in which the hinge assembly 100 pivots during the transition from the closed position to the service position.

Returning to FIG. 1, the vehicle 102 also includes at least one sensor 120, a controller 122, and an actuator 128. The sensor 120 is operable to detect when the hood 112 experiences an impact. In response, the sensor 120 provides a suitable signal to the controller 122, which in turn, transmits a signal to the actuator 128. The actuator 128 provides a force to the hinge assembly 100 to move the hinge assembly 100 and hood 112 from the closed position of FIG. 1 to an incident (or third) in a manner that will be described below.

Figure 3:
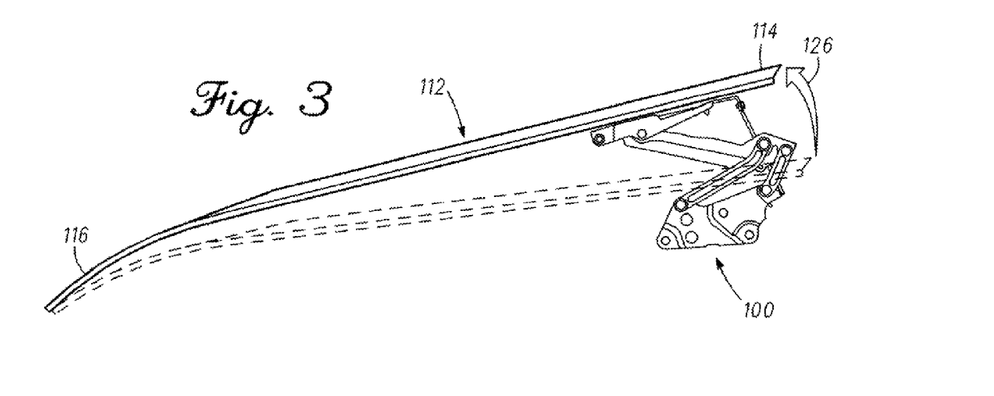
FIG. 3 is a side view of a hood with the hood hinge assembly of FIG. 1 in an incident position.

FIG. 3 is a side view of the hood 112 with the hinge assembly 100 in the incident position, i.e., after the sensor 120 (FIG. 1) has detected an impact and the hood hinge assembly 100 pivots the hood in direction 126. The incident position creates space between the hood 112 and the engine. As described below, the hinge assembly 100 may further be positioned in a relatched position in which the hinge assembly 100 is returned to a generally closed position from the incident position.

Figure 4:
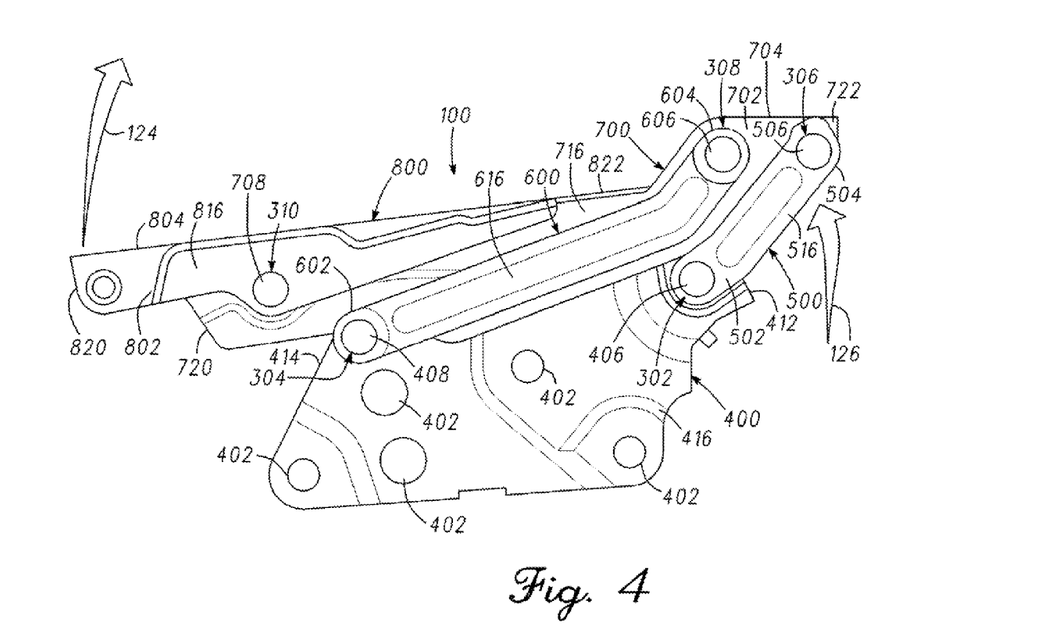
FIG. 4 is a first side view of the hood hinge assembly of FIG. 1 in the closed position.
Figure 5:
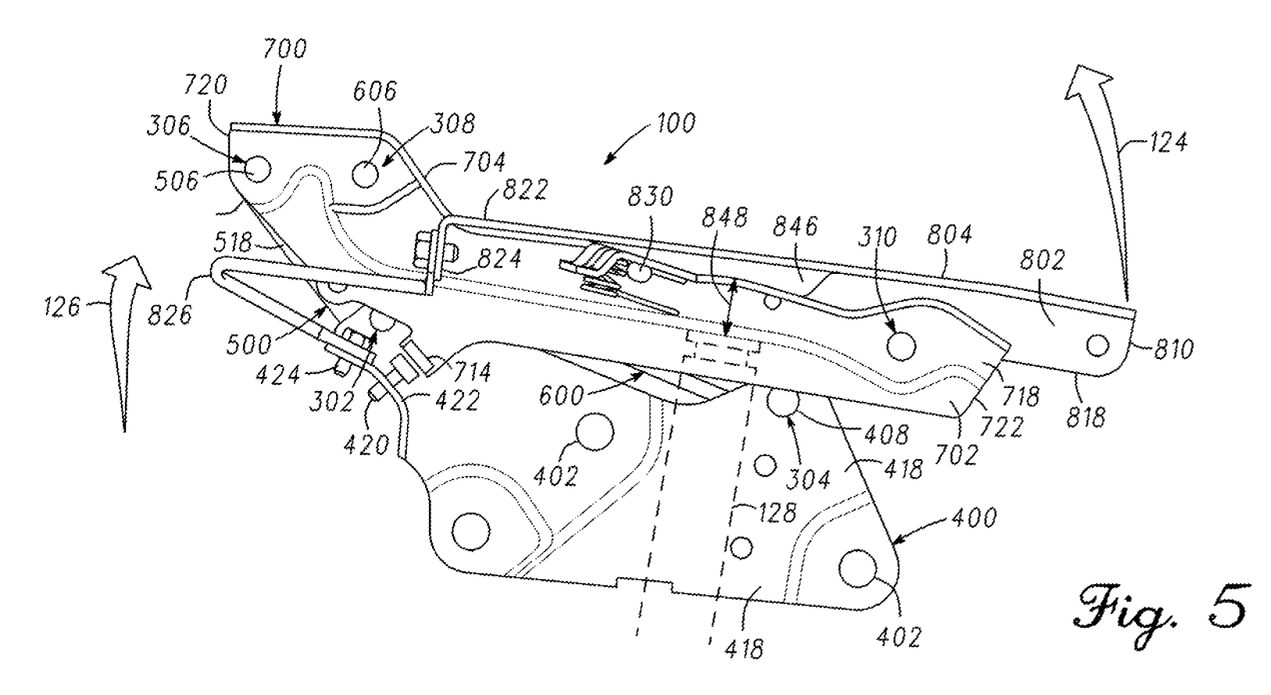
FIG. 5 is a second side view of the hood hinge assembly of FIG. 1 in the closed position.
Figure 6:
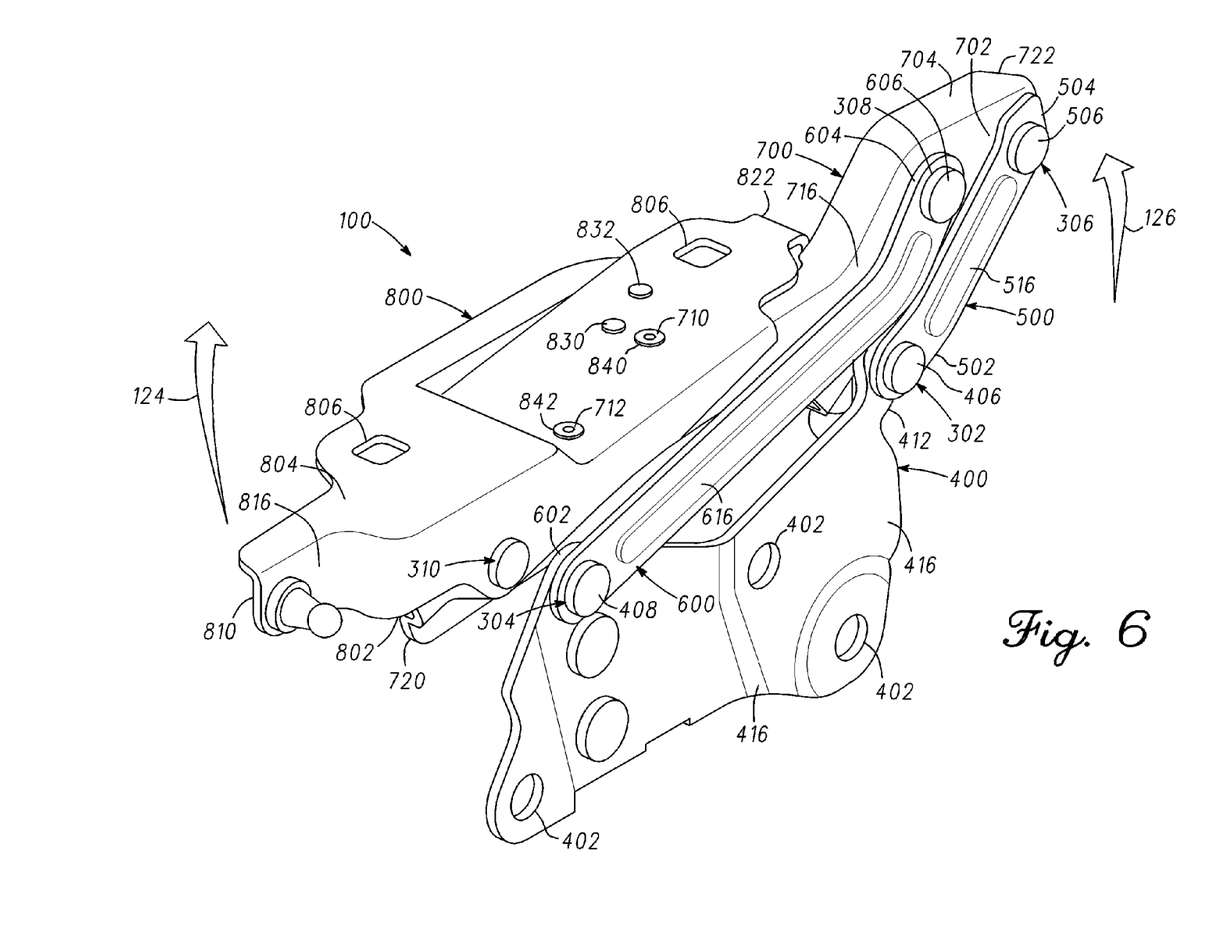
FIG. 6 is an isometric view from the top and first side of the hood hinge assembly of FIG. 1 in the closed position.
Figure 7:
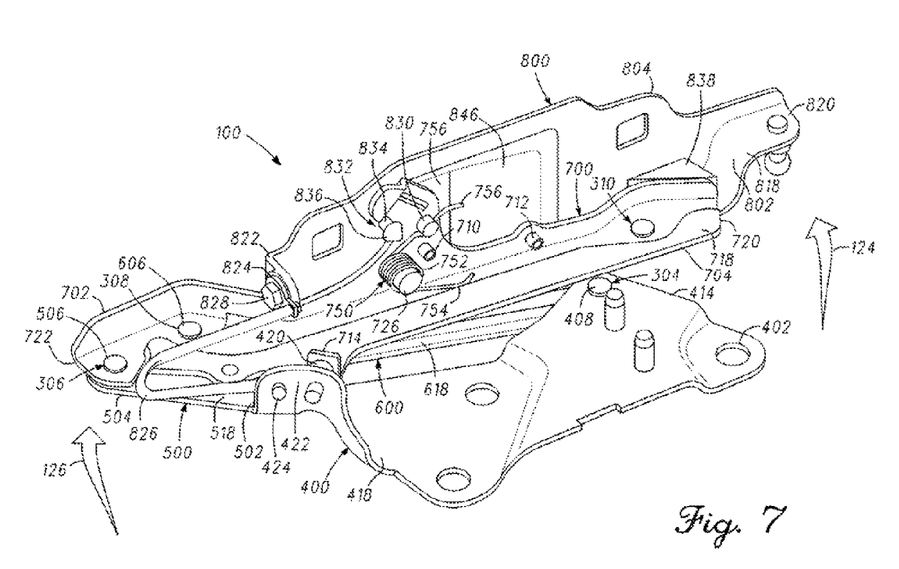
FIG. 7 is an isometric view from the bottom and second side of the hood hinge assembly of FIG. 1 in the closed position.

FIGS. 4-7 are various views of the hinge assembly 100 in a closed position and are collectively discussed below. The closed position may also be considered a retracted position. In the views discussed below, FIG. 4 is a first side view, FIG. 5 is a second side view, FIG. 6 is an isometric view from the top and first side, and FIG. 7 is an isometric view from the bottom and second side. To provide the proper perspective, the first pivot direction 124, which indicates the direction of movement from the closed position to the service position, and the second pivot direction 126, which indicates the direction of movement from the closed position to the incident position, are shown in FIGS. 4-7.

The hinge assembly 100 includes a body link 400, a short intermediate link 500, a long intermediate link 600, a deploy link 700, and a hood link 800. The body link 400 is generally plate-like and includes a plurality of apertures 402 to operatively fix the body link 400 to the vehicle body 104 (FIG. 1) by a suitable mechanism, such as fasteners (not shown). In some embodiments, the body link 400 is integral with the body 104. The body link 400 generally has a first side 416 (FIGS. 4 and 6) and a second side 418 (FIGS. 5 and 7).

The short intermediate link 500 is generally elongate and extends between the body link 400 and the deploy link 700. The short intermediate link 500 includes a first side 516 (FIGS. 4 and 6), a second side 518 (FIGS. 5 and 7), a bottom end 502, and a top end 504. A fastener 406, such as a weld nut or rivet, couples the bottom end 502 of the short intermediate link 500 to a top and back corner 412 of the base link 400. Another fastener 506, such as a weld nut or rivet, couples the top end 504 of the short intermediate link 500 to the deploy link 700.

The long intermediate link 600 is generally elongate and extends between the body link 400 and the deploy link 700. The long intermediate link 600 includes a first side 616 (FIGS. 4 and 6), a second side 618 (FIGS. 5 and 7), a bottom end 602, and a top end 604. Particularly, a fastener 408, such as a weld nut or rivet, couples the bottom end 602 of the long intermediate link 600 to a top and front corner 414 of the base link 400. Another fastener 606, such as a weld nut or rivet, couples the top end 604 of the long intermediate link 600 to the deploy link 700.

The deploy link 700 is generally planar and elongate. The deploy link 700 includes a first side 716 (FIGS. 4 and 6), a second side 718 (FIGS. 5 and 7), a front end 720, and a back end 722. The deploy link 700 also includes a first portion 702 and a second portion 704. The first portion 702 is generally parallel to the body link 400, the short intermediate link 500, and the long intermediate link 600. The second portion 704 is disposed at a positive angle relative to the first portion 702, and in the exemplary embodiment best shown by FIGS. 6 and 7, extends perpendicularly from the first portion 702.

As noted above, the fastener 506 couples the short intermediate link 500 to the deploy link 700, and the fastener 606 couples the long intermediate link 600 to the deploy link 700. Particularly, the fasteners 506 and 606 respectively couple the short intermediate link 500 and the long intermediate link 600 to the back end 722 of the deploy link 700, with the fastener 606 of the long intermediate link 660 being forward of the fastener 506 of the short intermediate link 500.

The hood link 800 is generally planar and elongate with a first side 816 (FIGS. 4 and 6), a second side 818 (FIGS. 5 and 7), a front end 820, and a back end 822. The hood link 800 includes a first portion 802 and a second portion 804. The first portion 802 is generally parallel to the body link 400, the short intermediate link 500, the long intermediate link 600, and the first portion 702 of the deploy link 700. The second portion 804 is disposed at a positive angle relative to the first portion 802, and in the exemplary embodiment best shown by FIGS. 6 and 7, extends perpendicularly from the first portion 802. A fastener 708 couples the first portion 802 of the hood link 800 to the first portion 702 of the deploy link 700. As best shown in FIGS. 6 and 7, a number of apertures 806 in the second portion 804 positioned to operatively fix the hood link 800 to the hood 112 of the vehicle 102 (FIG. 1) by a suitable mechanism, such as fasteners (not shown). In some embodiments, the hood link 800 is integral with the hood 112 (FIG. 1).

The hinge assembly 100 further includes a number of cooperating elements, the function of which are described in further detail below. Referring particularly to FIGS. 6 and 7, a first blind rivet 710 and a second blind rivet 712 additionally fasten the second portion 704 of the deploy link 700 to the second portion 804 of the hood link 800. Particularly, the first blind rivet 710 extends through an aperture 840 in the hood link 800 and an aperture 728 in the deploy link 700, and the second blind rivet 712 extends through another aperture 842 in the hood link 800 and another aperture 730 in the deploy link 700. One or both of the blind rivets 710 and 712 may be omitted.

A flange 714 extends from the second side 718 of the deploy link 700. The flange 714 is positioned proximate to a stopper 420 mounted on a flange 422 extending from the second side 418 of the body link 400. A flange 824 extends from the second side 818, and a tether 826 extends between the flange 824 in the deploy link 700 and the flange 422 in the body link 400. The tether 826 is respectively fastened to the flange 422 and the flange 824 by fastener 424 and fastener 828.

A retaining pin 830 extends from the second side 818 of the second portion 804 through an aperture 724 in the second portion 704 of the deploy link 700. A relatch pin 832 extends from the second side 818 of the second portion 804 of the deploy link 700. The relatch pin 832 generally includes a narrow portion 834 and a cone tip end 836. A spring post 726 extends from the second side 718 of the deploy link 700. An energy absorbing wedge 838 is positioned between the front end 720 of the deploy link 700 and the front end 820 of the hood link 800, particularly between the first side 716 of the second portion 704 of the deploy link 700 and the second side 818 of the second portion 804 of the hood link 800.

As only shown schematically in FIG. 5, the actuator 128 may be attached to the body 104 (FIG. 1) of the vehicle 102 or to the body link 400. As will be described below, the actuator 128 is generally positioned proximate to a striker plate 846 on the second side 818 of the second portion 804 of the hood link 800. In one exemplary embodiment, a gap 848 is maintained between actuator 128 and the striker plate 846 of the hood link 800 in the closed position. The actuator 128 may include a piston 130, which is in a retracted (or loaded) position in FIG. 5. The actuator 128 may be of any suitable type, such as a piston slidably attached to a cylinder actuator or a bellows chamber actuator, which expands when pressurized with air.

In some positions, including the closed position, a latch assembly 750 also couples the deploy link 700 to the hood link 800. The latch assembly 750 includes a spring 752 wrapped around the post 726 extending from the second side 718 of the second portion 704 of the deploy link 700. In the closed position, a first end 754 of the spring 752 is biased against the second side 718 of the first portion 702, and a second end 756 of the spring 752 is biased against the retaining pin 830. As described below, in the relatched position, the second spring end 756 is biased against the relatch pin 832.

As discussed below in greater detail, the fastener 406 defines a first pivot point 302 to enable pivoting between the body link 400 and the short intermediate link 500. The fastener 408 defines a second pivot point 304 to enable pivoting between the body link 400 and the long intermediate link 600. The fastener 506 defines a third pivot point 306 to enable pivoting between the short intermediate link 500 and the deploy link 700. The fastener 606 defines a fourth pivot point 308 to enable pivoting between the long intermediate link 600 and the deploy link 700. The fastener 708 defines a fifth pivot point 310 to enable pivoting between the hood link 800 and the deploy link 700. The pivot points 302, 304, 306, 308, and 310 generally enable pivoting movement between the respective components while restricting linear movement.

Figure 8:
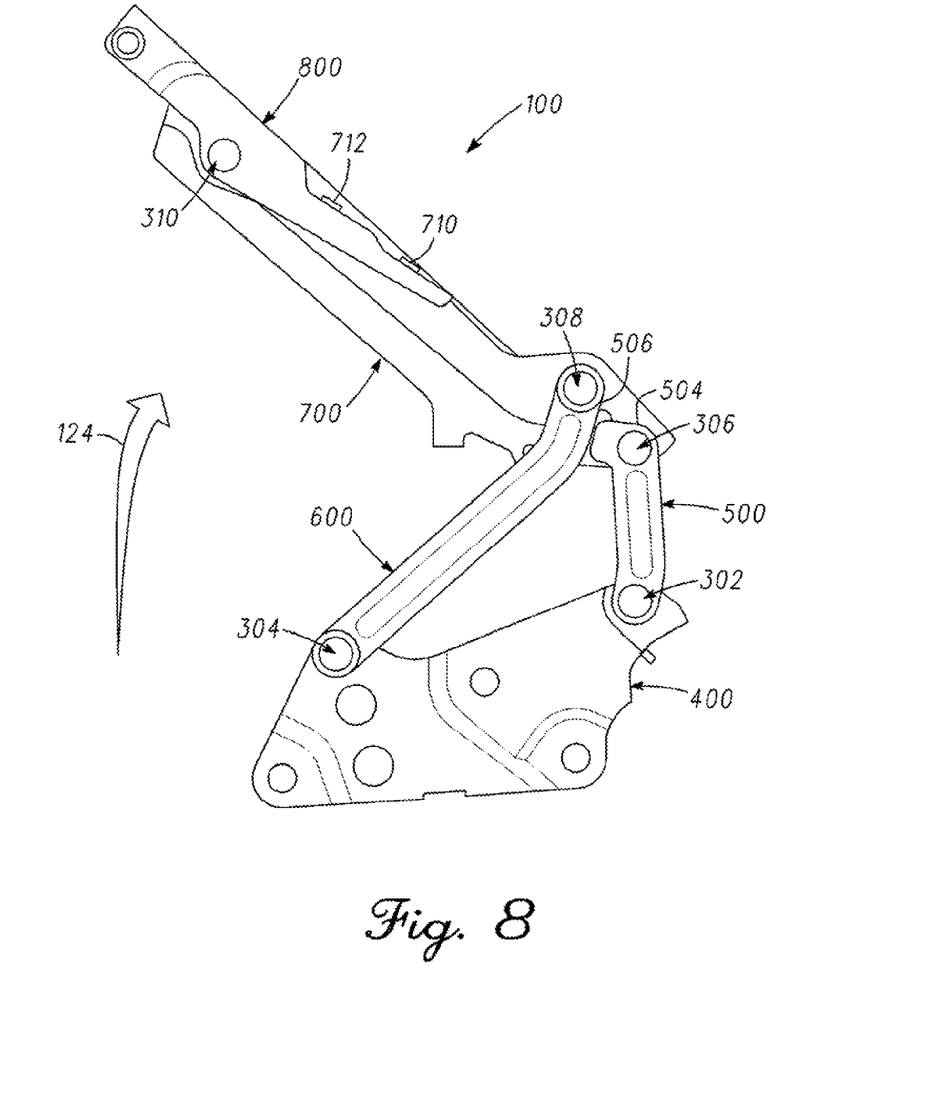
FIG. 8 is a side view of the hood hinge assembly of FIG. 1 in the service position.

FIG. 8 is a second side view of the hinge assembly 100 in the service position. Although not shown in FIG. 8, the service position is a result of unlatching the latch on the front end of the hood and extending the hinge assembly 100 in the direction 124. In this position, the hinge assembly 100 pivots about the first pivot point 302, the second pivot point 304, the third pivot point 306, and the fourth pivot point 308. In the service position, the top end 504 of the short intermediate link 500 abuts the top end 604 of the long intermediate link 600 to limit the extent of pivoting in the direction 124. In other words, the top end 504 of the short intermediate link 500 abuts the top end 604 of the long intermediate link 600 to function as a service stop.

During the transition from the closed positioned to the service position, the deploy link 700 and hood link 800 pivot together and maintain relative positions. Particularly, the location of the pivot points 302, 304, 306, and 306, the first blind rivet 710, and the second blind rivet 712 maintain the relative positions of the deploy link 700 and the hood link 800 in the closed position and service position.

Figure 9:
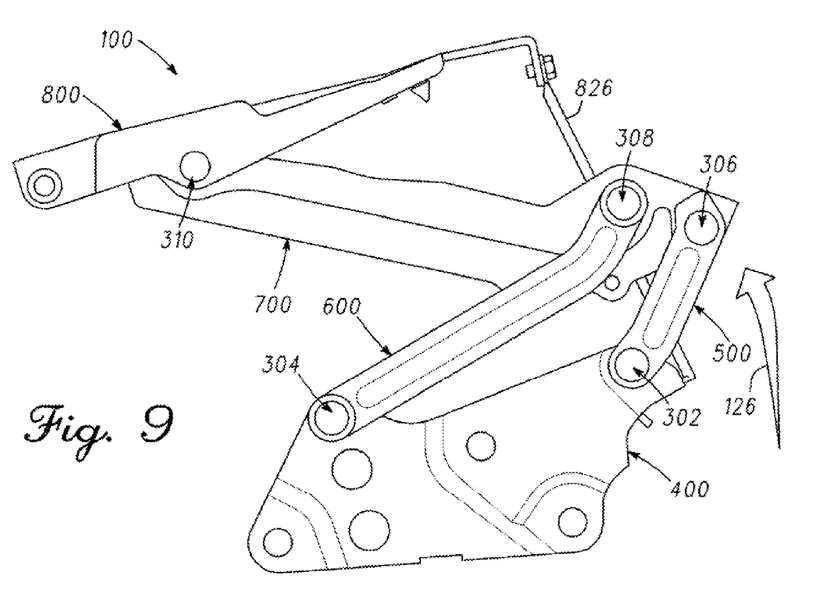
FIG. 9 is a first side view of the hood hinge assembly of FIG. 1 in the incident position.
Figure 10:
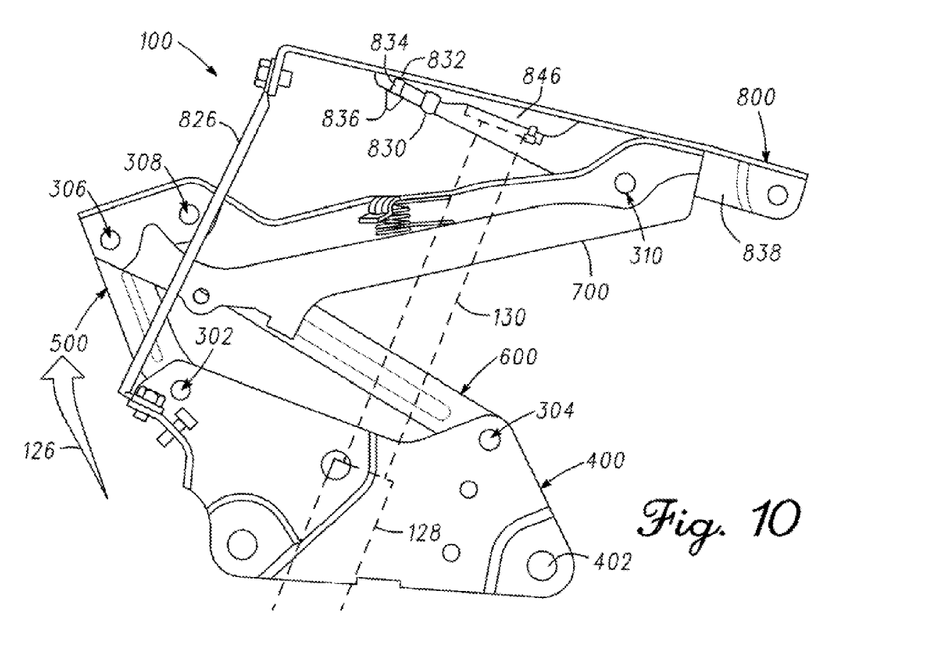
FIG. 10 is a second side view of the hood hinge assembly of FIG. 1 in the incident position.
Figure 11:
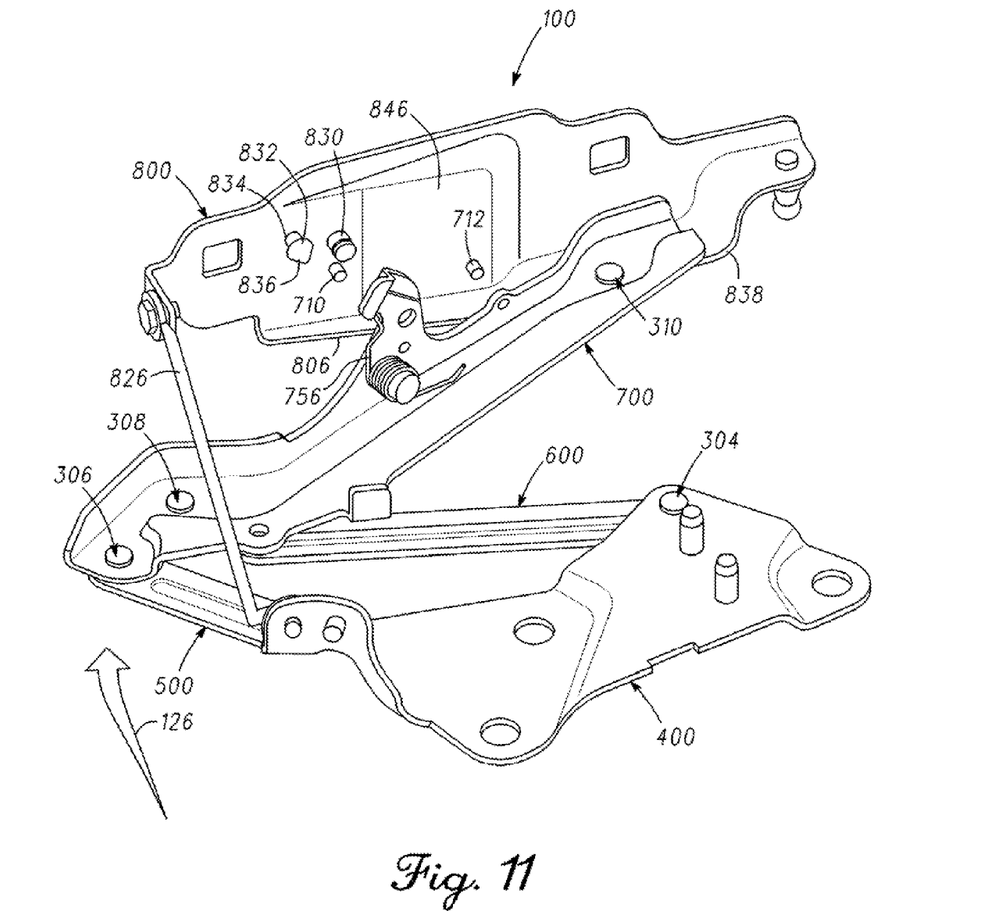
FIG. 11 is an isometric view from the bottom and second side of the hood hinge assembly of FIG. 1 in the incident position.

FIGS. 9-11 are various views of the hinge assembly 100 in the incident position and are collectively discussed below. As noted above, the hinge assembly 100 pivots generally about the front end of the hood 112 (FIG. 1) in the direction 126 into the incident position as a result of an impact. In the views discussed below, FIG. 9 is a first side view, FIG. 10 is a second side view, and FIG. 11 is an isometric view from the bottom and second sides. To provide the proper perspective, the second pivot direction 126, which indicates the direction of movement from the closed position to the incident position, is shown in FIGS. 9-11. FIG. 10 additionally shows a schematic position of the actuator 128 that provides a force via the piston 130 to move the hinge assembly 100 into the incident position, as discussed below.

In the incident position, the hinge assembly 100 pivots about the first pivot point 302, the second pivot point 304, the third pivot point 306, and the fourth pivot point 308 such that the deploy link 700 moves away from the body link 400. Additionally, the hinge assembly 100 pivots about the fifth pivot point 310 such that the deploy link 700 pivots relative to the hood link 800. In this position, the first blind rivet 710 separates and slides out of the aperture 840 in the hood link 800, and the second blind rivet 712 separates and slides out of the aperture 842 in the hood link 800. This enables partial separation and relative freedom between the hood link 800 and deploy link 700, as well as the ability to pivot about the fifth pivot point 310. The tether 826, when taut, functions to limit the degree of pivot about the fifth pivot point 310.

The operation and transition from the closed position to the incident position will now be described. As noted above in the discussion of FIG. 1, when the sensor 120 detects an impact, the sensor 120 provides a signal to the controller 122, which provides a resulting signal to the actuator 128. The piston 130 of the actuator 128 fires upward to close the gap 848 (FIG. 5) and impact the striker plate 846 on the hood link 800, as shown in FIG. 10. As a result, the back end 114 of the hood 112 (FIG. 3) is raised. The force of the piston 130 on the hood link 800 is sufficient to destruct or otherwise separate the blind rivets 710 and 712, and thus, enable relative movement between the hood link 800 and the deploy link 700 in the direction 126. The force of the actuator 128 and movement of the hood link 800 additionally results in some pivoting of the hinge assembly 100 about the first pivot point 302, the second pivot point 304, the third pivot point 306, and the fourth pivot point 308. During the transition into the incident position, the second spring end 756 slides off the retaining pin 830 as the retaining pin 830 slides out of the aperture 806 when the hood link 800 pivots relative to the deploy link 700. This enables a subsequent transition of the hinge assembly 100 into the relatch position, as discussed below.

During the transition into the incident position, the arrangement of the actuator 128 and configuration of the hinge assembly 100 minimizes any sliding movement of the piston 130 relative to the striker plate 846. This results in the actuator 128 maintaining the force moment about the fifth pivot point 310, which generally minimizes any fore or aft movement of the hood 112 (FIG. 1) during an incident. As such, after the incident, the hood 112 (FIG. 1) maintains an alignment with the other portions of the vehicle 102 (FIG. 1) to enable efficient movement into the relatch position, discussed below.

As noted above, in one exemplary embodiment, the tether 826 limits the angular distance that the deploy link 700 moves relative to the base link 400. Particularly, the tether 826 reduces unnecessary oscillation of the hinge assembly 100 during the incident. The energy absorbing wedge 838 positioned between the back end 722 of the deploy link 700 and the back end 822 of the hood link 800 also functions to dampen oscillations of the hood link 800 and deploy link 700 during an incident. As such, the tether 826 and the energy absorbing wedge 838 may prevent damage to the hinge assembly 100 and other portions of the hood 112 (FIG. 1) resulting from the force of the actuator 128.

Figure 12:
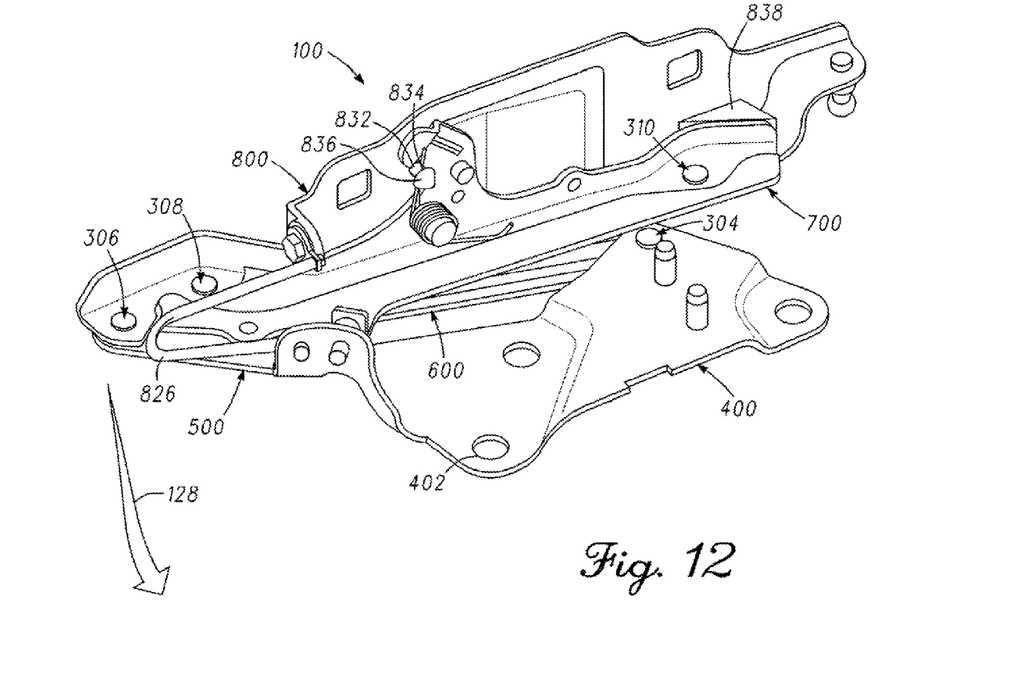
FIG. 12 is an isometric view from the bottom and second side of the hood hinge assembly of FIG. 1 in a relatched position.

After the incident, the user may want to move the hinge assembly 100 from the incident position into the relatch position, for example, to prevent the hood 112 (FIG. 1) from obstructing a windshield of the vehicle 102 (FIG. 1). FIG. 12 is an isometric view from the bottom and second side of the hinge assembly 100 in the relatch position. From the incident position, a user may provide a force to pivot the hood link 800 about the deploy link 700 at the fifth pivot point 310. The hinge assembly 100 also pivots about the first pivot point 302, the second pivot point 304, the third pivot point 306, and the fourth pivot point 308 such that the hinge assembly 100 moves into the relatch position, which is similar to the closed position.

As noted above, during movement into the incident position, the second spring end 756 of the latch assembly 750 slides off the retaining pin 830 as the retaining pin 832 slides out of the aperture 806 when the hood link 800 pivots relative to the deploy link 700. This results in the second spring end 756 biasing into a position beyond the retaining pin 832. When the deploy link 700 and hood link 800 pivot back together, the second spring end 756 engages the relatch pin 832 and slides over the cone tip end 836 onto the narrow portion 834. The cone tip end 836 functions to retain the second spring end 756 from sliding back off the relatch pin 832, and thus, functions to maintain the collapsed position of the hood link 800 and the deploy link 700. This secures the hinge assembly 100 in the relatch position.

Accordingly, exemplary embodiments of the hinge assembly 100 described above enable a back end of the hood to be raised without undue fore and aft movement. The exemplary hinge assembly 100 may also be relatched after an incident. Generally, the exemplary hinge assembly 100 may be substantially robust, maintain substantially stable movements, and substantially compact to avoid interference with other components in the engine compartment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A hood hinge assembly for operatively attaching a hood to a vehicle comprising:
    a base link configured to be coupled to the vehicle;
    a deploy link coupled to the base link;
    a hood link coupled to the deploy link and configured to be coupled to the hood,
    wherein, in a first transition from a first position into a second position, the hood link and the deploy link pivot with one another relative to the base link, and
    wherein, in a second transition from the first position into a third position, the hood link pivots relative to the deploy link;
    a first intermediate link coupling the base link to the deploy link such that the first intermediate link forms a first pivot point with the base link and a second pivot point with the deploy link;
    a second intermediate link coupling the base link to the deploy link such that the second intermediate link forms a third pivot point with the base link and a fourth pivot point with the deploy link,
    wherein the hood link and deploy link are coupled together at a fifth pivot point,
    wherein, in the first transition, the base link and the first intermediate link pivot about the first pivot point, the base link and the second intermediate link pivot about the third pivot point, the deploy link and the first intermediate link pivot about the second pivot point, and the deploy link and the second intermediate link pivot about the fourth pivot point, and
    wherein, in the second transition, the hood link and the deploy link pivot about the fifth pivot point in a first direction, and wherein, in a third transition from the third position into a fourth position, the hood link and deploy link pivot about the fifth pivot point in a second direction; and
    a latch assembly configured to couple the hood link to the deploy link in the fourth position,
    wherein the hood link includes a first post and a second post, and wherein the deploy link includes an aperture that receives the first post in the first position and a spring with an end that biases against the first post in the first position.

2. The hood hinge assembly of claim 1, further comprising
    a sensor configured to detect an impact on the hood and, in response, to produce a first signal;
    a controller coupled to the sensor and configured to receive the first signal and to produce a second signal based on the first signal; and
    an actuator coupled to the controller and configured to receive the second signal and, in response, to provide a force to the hood link.

3. The hood hinge assembly of claim 2, wherein the force of the actuator pivots the hood link about the fifth pivot point into the third position.

4. The hood hinge assembly of claim 2, further comprising a blind rivet further coupling the deploy link to the hood link in the first position and the second position.

5. The hood hinge assembly of claim 4, wherein the force of the actuator is configured to separate the blind rivet as the deploy link pivots relative to the hood link.

6. The hood hinge assembly of claim 1, wherein the base link has a front end and a back end, the first intermediate link has a first end and a second end, and the second intermediate link has a first end and a second end, and
    wherein the first pivot point is positioned on the front end of the base link and the first end of the first intermediate link, and the second pivot point is positioned on the back end of the base link and the first end of the second intermediate link.

7. The hood hinge assembly of claim 6, wherein the deploy link has a front end and a back end, and wherein the third pivot point is positioned on the back end of the deploy link and the second end of the first intermediate link, the fourth pivot point is positioned on the back end of the deploy link and the second end of the second intermediate link, and the fifth pivot point is positioned on the front end of the deploy link and the hood link.

8. The hood hinge assembly of claim 7, further comprising a tether coupled to the base link and the hood link to limit pivoting of the hood link.

9. The hood hinge assembly of the claim 8, wherein the hood link has a front end and a back end, and wherein the tether is coupled to the back end of the hood link and the back end of the base link.

10. The hood hinge assembly of claim 1, further comprising an energy absorbing wedge positioned between the deploy link and the hood link.

11. The hood hinge assembly of claim 1, wherein, during the second transition, the first post slides out of the aperture to release the end of the spring such that, during the third transition, the end of the spring engages the second post to be retained by the second post in the fourth position.

12. The hood hinge assembly of claim 11, wherein the second post and the spring end are configured to prevent relative movement of the deploy link and the hood link in the fourth position.

13. A hood hinge assembly for operatively attaching a hood to a vehicle comprising:
- a base link configured to be coupled to the vehicle;
- a first intermediate link coupled to the base link at a first pivot point;
- a second intermediate link coupled to the base link at a second pivot point;
- a deploy link coupled to the first intermediate link at a third pivot point and to the second intermediate link at a fourth pivot point;
- a hood link coupled to the deploy link at a fifth pivot point and configured to be coupled to the hood;
- a tether extending between the hood link and the base link,
- wherein, in a first transition from a first position into a second position, the base link and the first intermediate link pivot about the first pivot point, the base link and the second intermediate link pivot about the second pivot point, the deploy link and the first intermediate link pivot about the third pivot point, and the deploy link and the second intermediate link pivot about the fourth pivot point, and
- wherein, in a second transition from the first position into a third position, the hood link and the deploy link pivot about the fifth pivot point; and
- an energy absorbing wedge positioned between the deploy link and the hood link.

14. The hood hinge assembly of the claim 13, further comprising a blind rivet coupling the hood link to the deploy link in the first and second positions and a latch assembly coupling the hood link to the deploy link in a fourth position.

15. A hood hinge assembly for operatively attaching a hood to a vehicle comprising:
- a base link configured to be coupled to the vehicle;
- a first intermediate link attached to the base link at a first pivot point;
- a second intermediate link attached to the base link at a second pivot point;
- a deploy link attached to the first intermediate link at a third pivot point and to the second intermediate link at a fourth pivot point;
- a hood link attached to the deploy link at a fifth pivot point and configured to be coupled to the hood;
- a blind rivet coupling the deploy link to the hood link in a first position and a second position and configured to separate in a third position;
- an actuator, upon actuation, configured to engage the hood link; and
- a latch assembly configured to couple the hood link to the deploy link in a fourth position,
- wherein, in a first transition from the first position into the second position, the base link and the first intermediate link pivot about the first pivot point, the base link and the second intermediate link pivot about the second pivot point, the deploy link and the first intermediate link pivot about the third pivot point, and the deploy link and the second intermediate link pivot about the fourth pivot point,
- wherein, in a second transition from the first position into the third position, the actuator impacts the hood link such that the blind rivet separates and the hood link and the deploy link pivot about the fifth pivot point into the third position, and
- wherein, upon a third transition from the first third position into the fourth position, the latch assembly couples the hood link and the deploy link to prevent relative movement about the fifth pivot point.

\* \* \* \* \*